United States Patent [19]
Edmonds et al.

[11] Patent Number: 5,137,327
[45] Date of Patent: Aug. 11, 1992

[54] VEHICLE VENT AND ESCAPE HATCH

[76] Inventors: R. Michael Edmonds, 4 Cameron Ct., Columbia, S.C. 29205; Randall C. Hansen, 111 N. Sheraton Rd., Lake Forest, Ill. 60045; Timothy A. Kelly, 775 Virginia Ave., Salem, Va. 24153

[21] Appl. No.: 701,581

[22] Filed: May 14, 1991

Related U.S. Application Data

[63] Continuation of Ser. No. 588,842, Sep. 27, 1990, abandoned.

[51] Int. Cl.$^5$ .............................................. B60J 7/185
[52] U.S. Cl. .................................... 296/224; 296/216; 49/141; 49/394; 292/170; 292/DIG. 5; 292/DIG. 65; 16/259; 16/266
[58] Field of Search ............... 296/216, 218, 224; 49/141, 193, 394; 292/93, 170, DIG. 5, DIG. 65; 98/2.14; 16/258, 259, 266

[56] References Cited

U.S. PATENT DOCUMENTS

| | | | |
|---|---|---|---|
| 1,828,152 | 10/1931 | Nonamaker | 292/170 |
| 2,389,315 | 11/1945 | Kerr | 292/DIG. 65 X |
| 2,392,874 | 1/1946 | Pelaez | 292/DIG. 65 X |
| 4,021,073 | 5/1977 | Manning | 296/224 X |
| 4,412,404 | 11/1983 | Manning | 296/216 X |
| 4,433,506 | 2/1984 | Manning | 292/DIG. 65 |
| 4,819,985 | 4/1989 | Williams | 296/224 X |
| 4,950,018 | 8/1990 | Jeffords et al. | 49/141 X |
| 4,964,673 | 10/1990 | Lamparter | 296/216 |

FOREIGN PATENT DOCUMENTS 1022964 12/1977 Canada .............................. 296/216

Primary Examiner—Dennis H. Pedder
Attorney, Agent, or Firm—Wilmer Mechlin

[57] ABSTRACT

Combined vehicle vent and escape hatch having a frame bounding a roof opening, a cover hingedly connected to opposite sides of the frame by hinge brackets for limited venting movement relative to one or more of the sides, one of the brackets being separable into cover and frame parts and normally prevented from separating by a cammable release rod engaging the cover part and a frame-backed movable stop plate backing the rod, and an emergency button instanding from the cover and when pushed operative to project the cover from all of said sides to full venting position and separate the parts of the separable bracket for enabling the cover, as an escape hatch, to be swung about the opposite bracket to open position. For extending the service life of the combined vent and hatch, an inner panel of the cover is backed by a rigid metal backup plate on which, for relieving the panel of stress, are hung the operating parts attached to the cover.

10 Claims, 5 Drawing Sheets

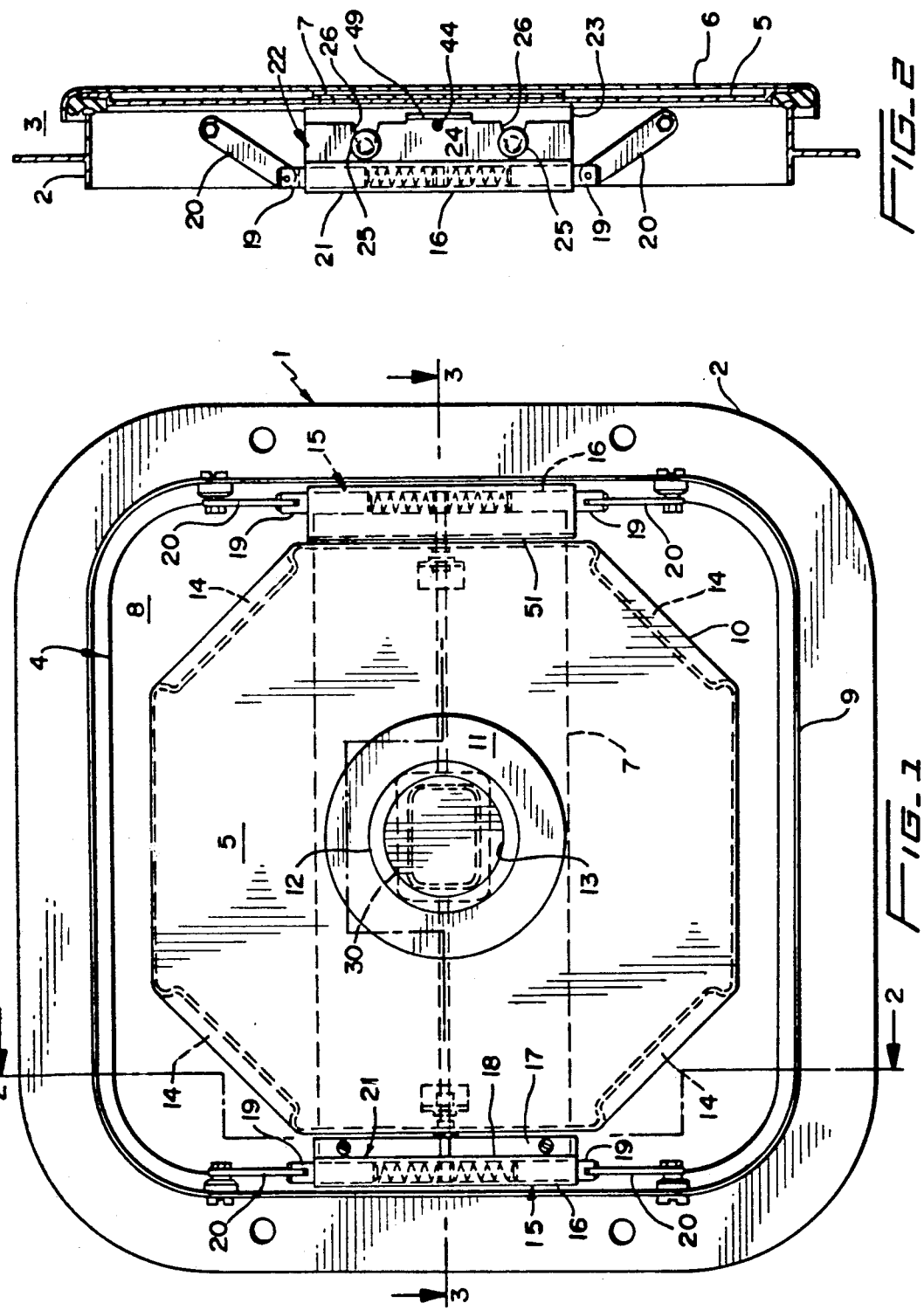

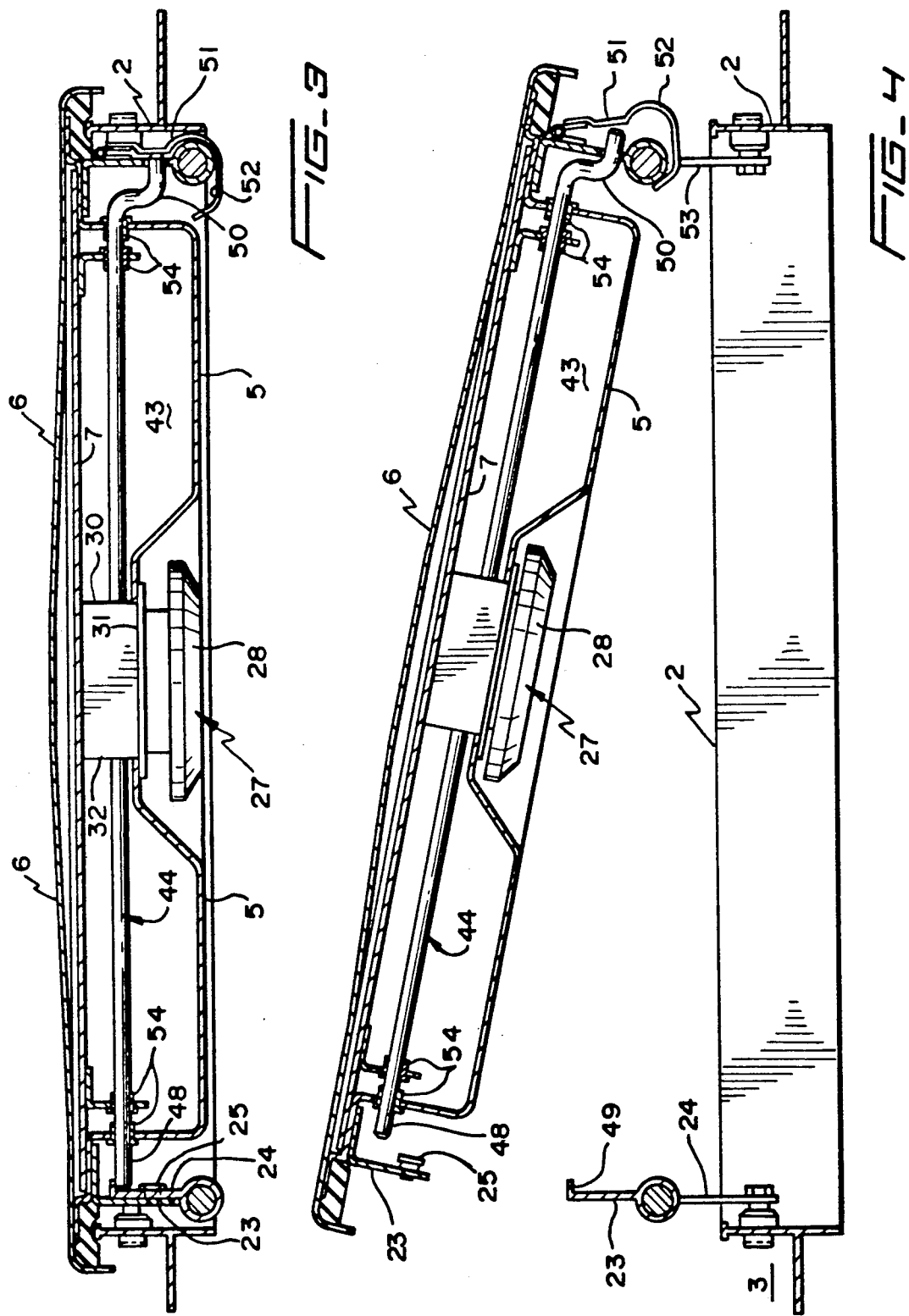

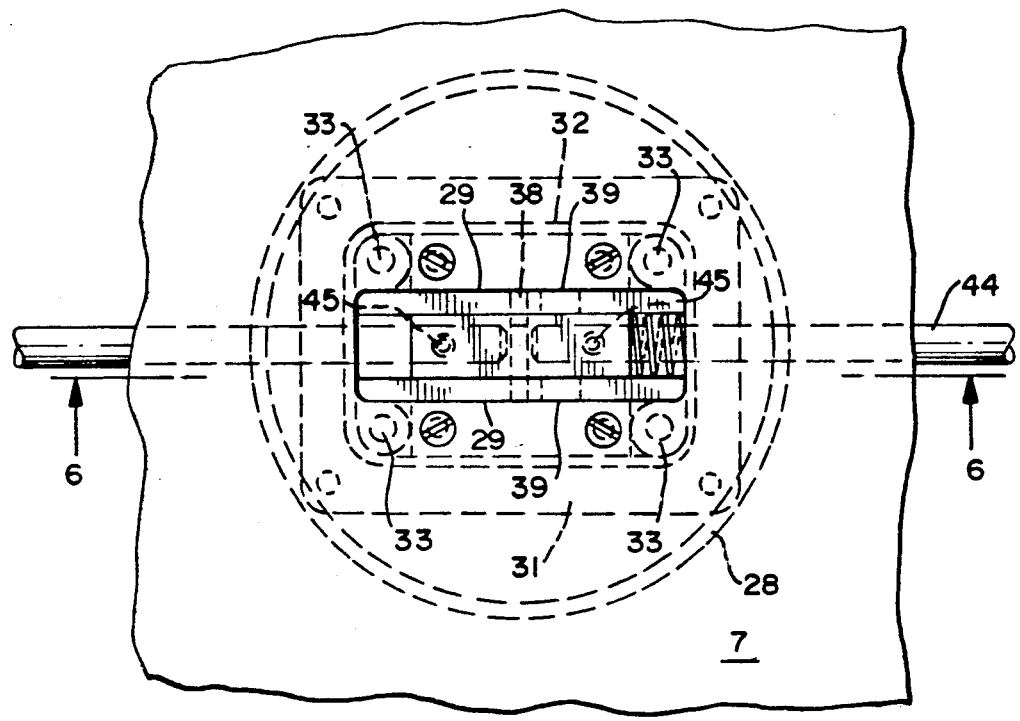
FIG_5
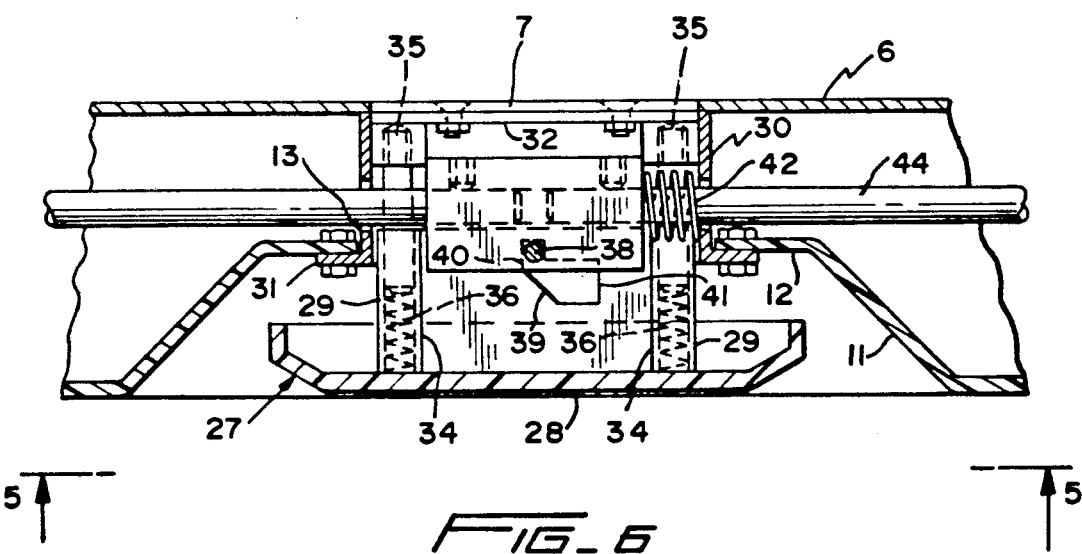
FIG_6

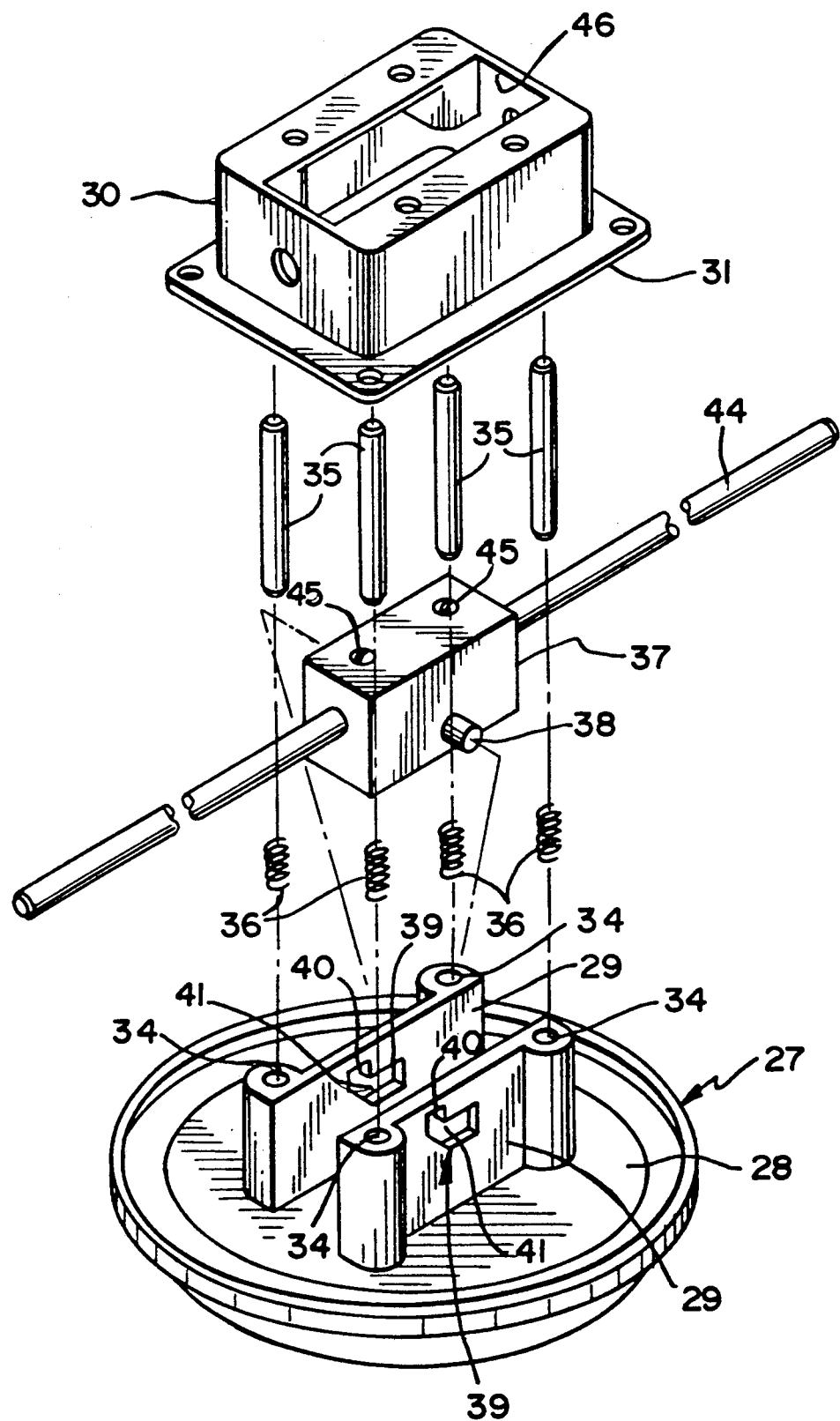
FIG_ 7

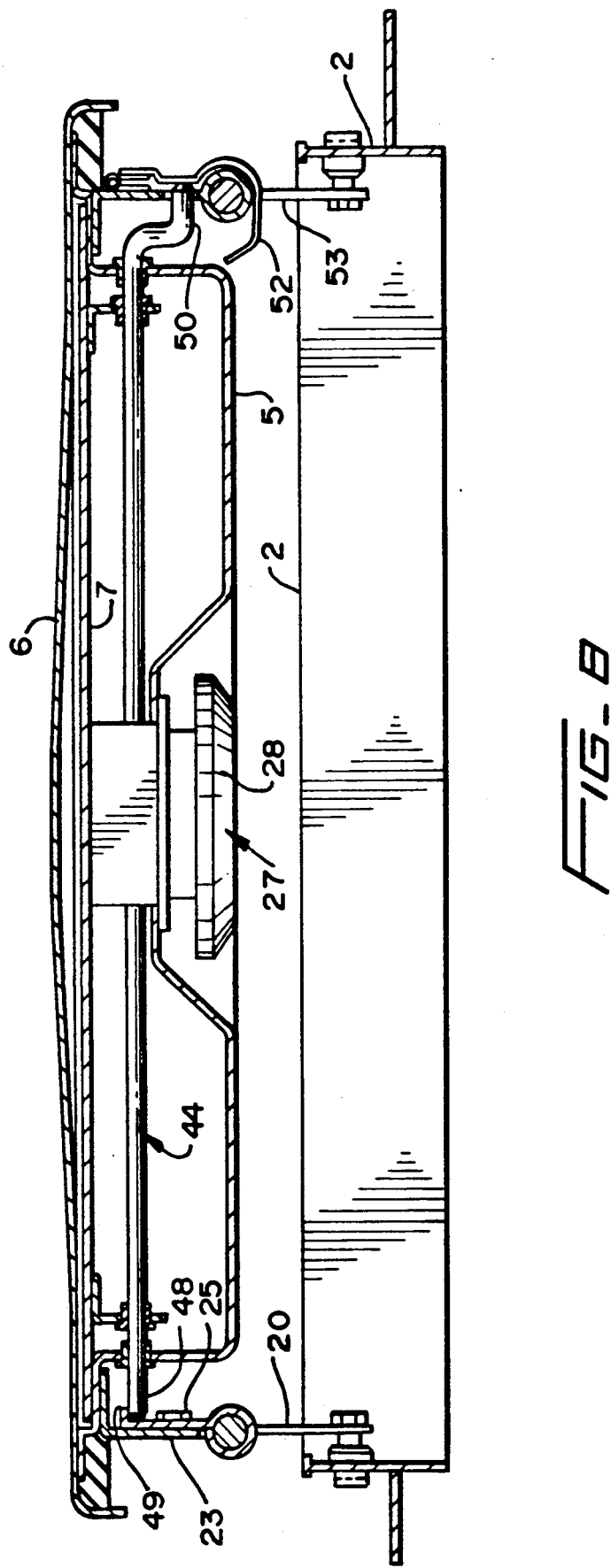

VEHICLE VENT AND ESCAPE HATCH

This application is a continuation of Ser. No. 07/588,842, filed Sep. 27, 1990, now abandoned.

BACKGROUND OF THE INVENTION

Heretofore, U.S. patents on combined vehicle vent and escape hatches, such as Manning U.S. Pat. Nos. 4,021,073, 4,412,404 and 4,433,506 and Kelly et al U.S. Pat. No. 4,519,645, have each had a cover or door hinged to opposite sides of a frame and depended on the separability of parts of one of the hinges for enabling the cover, as an escape hatch, to be swung to full open position about the other hinge. The problem common to these patents is that their separable hinges are adapted to be separated into parts when their covers are in closed position and in that position the covers are not swingable to full open position about the opposite hinge. It is to solving this problem that the present invention is directed.

SUMMARY OF THE INVENTION

The primary object of the present invention is to provide an improved combined vehicle vent and escape hatch having a cover hinged to opposite sides of a frame, wherein one of the hinges is separable and cannot separate when the cover is closed but is separable when the cover is projected to venting position and can be swung to open position about the opposite hinge.

Another object of the invention is to provide an improved combined vehicle vent and escape hatch having a cover hinged to opposite sides of a frame by hinges of which one is separable, whereof pushing of an emergency button instanding from the cover projects the cover to full venting position and by separating the one hinge, swings the cover to full open position about the other hinge.

An additional object of the invention is to provide a combined vehicle vent and escape hatch having a cover hinged to opposite sides of a frame by hinges of which one is separable, whereof the hinges are toggle linkages and cover and frame parts of the separable hinge are normally held against separation by the coaction of a cammable release rod engaging the cover part and a stop plate backing the rod.

A further object of the invention is to provide a combined vehicle vent and escape hatch having a cover hinged to opposite sides of a frame by hinges, one separable into cover and frame parts, wherein the hinges are toggle linkages enabling limited opening of the cover for venting relative to any or all sides of the frame, and an emergency button instanding from the cover is operative when pushed to project the cover to full venting position and by separating the separable hinge into its parts, swing the cover to full open position about the other hinge.

Another object of the invention is to provide a combined vehicle vent and escape hatch having a cover hinged to opposite sides of a frame bounding an opening in the vehicle by a pair of hinges of which one is separable into frame and cover parts, a lock rod normally engaging the cover part and held against disengagement by coaction of a frame-backed stop plate pivotally connected to the opposite hinge and a cam connection of a coupling block on the rod to a push button spring-mounted on and instanding from the cover, pushing of the button in an emergency projecting the cover to full venting position and by disengaging the lock rod from the cover part and separating the separable hinge into its parts, enabling the cover to be swung to full open position about the opposite hinge.

A further object of the invention is to provide a combined vehicle vent and escape hatch having a cover hinged to opposite sides of a frame by a pair of hinges, one of the hinges being separable into frame and cover parts and normally held against separation by a lock rod engaging the cover part and backed by a stop plate, a push button instanding from the cover and operative when actuated to release the cover for swinging to full open position about the inseparable hinge, and a rigid metal backup plate for relieving the cover of stress by having hung thereon operating parts attached to the cover.

The foregoing and other objects and advantages of the invention will appear hereinafter in the detailed description, be particularly pointed out in the appended claims, and be illustrated in the accompanying drawings, in which:

FIGURE DESCRIPTION

FIG. 1 is an inner plan view of a preferred embodiment of the combined vehicle vent and escape hatch assembly of the present invention;

FIG. 2 is a vertical sectional view taken along lines 2—2 of FIG. 1;

FIG. 3 is a vertical sectional view taken along lines 3—3 of FIG. 1, showing the cover locked in closed position;

FIG. 4 is a view on the section of FIG. 3, showing the cover unlocked and partly open in condition for swinging to full open position;

FIG. 5 is a fragmentary horizontal sectional view on an enlarged scale taken along lines 5—5 of FIG. 6;

FIG. 6 is a fragmentary vertical sectional view on the scale of FIG. 5 taken along lines 6—6 of FIG. 5, showing in normal or inactive condition the button assembly for enabling the cover to serve as an escape hatch;

FIG. 7 is an exploded view of the button assembly on the scale of FIGS. 5 and 6; and FIG. 8 is a view on the section of FIG. 3, showing the cover in raised venting position with the separable hinge locked against separation.

DETAILED DESCRIPTION

Referring now in detail to the drawings in which like reference characters designate like parts, the improved combined vehicle vent and escape hatch or emergency escape vent assembly of the present invention, is particularly designed for installation in an opening in a roof or, if suitable for an emergency exit, even a floor or side of a passenger vehicle, such as a bus, for use both as a ventilator for venting the vehicle's interior and as an emergency escape hatch when access to a conventional exit is partly or totally blocked.

Designated as 1, the combined vehicle vent and escape hatch or emergency escape vent assembly of the present invention is comprised of a frame 2 bounding an opening 3, most usually in a roof (not shown) of a passenger vehicle (not shown). The opening 3 is openable and closable by a cover, closure member, door or lid 4 having a suitably vacuum molded plastic inner panel 5, an outer or external panel 6 and, between the panels, a suitably steel or other rigid metal backup plate 7 attached to and backing the inner panel. With a substantially flat peripheral flange or skirt 8 overlapping an upstanding inner rim 9 of the frame 2, the inner panel 5, inside the skirt, has a downwardly or inwardly projecting octagonal or eight-sided flat-topped hub, dome or protuberance 10 interrupted centrally by an upwardly extending conical-sided socket or pocket 11 opening upwardly through an annular flange 12 bounding a concentric suitably circular opening 13. For manual manipulation, the panel's hub 10 has handholds 14 formed in its sides facing corners of the frame 2.

The cover 4 is hinged or hingedly connected to opposite sides of the frame 2 and, as in the previously cited Manning and Kelly patents, the preferred hinges 15 are toggle linkages, each having a tube bracket 16 with a base flange 17 resting on and fixed or secured through the skirt 8 of the inner panel 5 to the backup plate 7. The tube 18 of each bracket 16 contains a pair of opposed spring-urged plungers 19, each pivotally connected to one end of a link 20, the other end of which is pivotally mounted on the frame 2. So hinged to the frame 2, the cover 4 is capable of limited opening venting movement toward front or rear or either side of the vehicle and in full venting position is open at all sides to the extent of its limited opening movement. Thus the cover 4 can be opened for venting relative to certain, selected, or any or all sides of a vehicle. As preferred, the pivots of the plungers 19 to the links 20 are over-centered relative to the pivots of the links to the frame 2 in any closed or limited opening venting position of the cover, thus enabling the toggle linkages to yieldably resist movement of the cover out of these positions.

While both of the pair of hinges 15 preferably are toggle linkages, and one is inseparable, the other linkage, designated as 21, is separable by dividing the web 22 between its tube 18 and base flange 17 into a pair of flanges, one a cover flange or part 23 connected to the cover 4 and the other a frame flange or part 24 connected to the frame, the parts having a sliding fit and normally being interfitted, interlocked or held together by a pair of laterally spaced headed pins 25 on the cover part slidably received in correspondingly spaced slots 26 in the frame part.

The operating mechanism of the vent and hatch assembly 1 includes among its operating parts the button assembly 27 of FIG. 7, having a spring-urged or mounted push button or knob 28 seating in the central socket 11 in and instanding from the cover's inner panel 5. Suitably formed as an aluminum casting, the button 28 has a pair of upstanding laterally spaced parallel arms 29 projecting through the central opening 13 in the inner panel 5 bounded by the annular flange 12, into a suitably cast aluminum housing 30. With a base flange 31 seating on and secured, as by bolting or riveting, to the annular flange 12, and a rectangular longitudinally elongated box-shaped body 32 surmounting the base flange and projecting through the opening 13, the button housing 30 has in its four corners inwardly or downwardly opening cylindrical sockets 33 aligning with outwardly or upwardly opening cylindrical sockets 34 in opposite ends of the button legs 29. The pairs of aligned sockets 33 and 34 each receive a guide pin 35 and return spring 36, and together both spring or yieldably mount the button 30 and guide and limit its movements between pushed or depressed and released positions.

Receiving the arms 29 of the button 28, the housing 30 contains a lock, cam or coupling block 37 straddled by and reciprocable between the button arms 29 and carrying or mounting a crosspin 38, laterally projecting ends of which ride or slide in duplicate cam slots 39 in sides of the button arms. The cam slots desirably are L-shaped, with narrow vertical legs 40 receiving or seating the crosspin in the button's normal, raised or projected position and elongated horizontal legs 41, occupied by the pin when the button 28 is pushed or depressed, enabling limited longitudinal movement of the block 37 in and relative to the housing 30 in a direction normal to and away from the separable hinge 21 under force of a spring 42 acting on the end of the block facing that hinge.

Contained in the space or compartment 43 between the inner and external panels 5 and 6, the lock block 37 also mounts or carries, as an included part of the button assembly 27, a lock rod 44 disposed normal, perpendicular or at right angles to the crosspin 38 and extending longitudinally across the cover with ends centered laterally on the hinges 15 at opposite sides of the frame 2. The lock rod 44 may be a single rod or for relative ease of assembly, a pair of rods coupled together by the lock block 37 and in either case the lock block is fixed, as by set screws 45, to the rod or pair of rods for movement in unison and against relative movement, Access for such fixing is obtained by aligned openings 46 in the housing 30 and 47 in the backup plate 7 to which the the housing is secured or fixed.

In the released or cocked position of the button 28 in which the crosspin 38 is in the vertical legs 40 of the camslots 39 in the button arms 29, the end 48 of the lock rod 44 adjoining or proximate to the then unseparated separable hinge 21 engages and underlaps an inturned flange or ledge 49 on the frame part 24 of the hinge's web 22 between or bracketed by the slots 26. The separable hinge 21 is thus normally held or locked against separation by engagement of the ledge 49 by one end of the lock rod 44, which in turn is then releasably held or locked against axial, rectilinear or longitudinal shifting or movement by retention of the crosspin 38 of the lock block 37 in the vertical legs 40 of the cam slots 39. So long as the cover is in the normal closed position of FIG. 3, axial shifting of the rod 44 to disengage the ledge 49 on the separable hinge 21 is prevented not only by the pin-and-slot connection between the lock block 37 and the button arms 29 but also by engagement of an offset opposite end 50 of the rod with a stop plate or shield 51 at the inseparable of the hinges 15. Conveniently hingedly or pivotally connected to and mounted back of the adjoining inseparable hinge 15 on the backup plate 7 through the peripheral skirt 8 of the inner panel 5, the stop shield 51 is vertically swingable through an arc limited by looping or partly wrapping its distal portion 52 around the hinge's tube 18. Suitably offset to abut or engage an intermediate part of the shield 51, the rod's offset end 50 passes though an apertured web 53 of the inseparable hinge and therebeyond engages the shield when, in the cover's closed position of FIG. 2, the shield is backed by the frame 2. Guides 54 engaging the rod 44 adjacent opposite ends guide its reciprocal movements.

Constructed in the above manner, the improved vent and hatch of the present invention can be projected to full or any intermediate venting position by an outward force applied manually through selective use of the handholds 14 in the inner panel 5. However, to enable a cover hinged to opposite sides of a frame to to be swung as an escape hatch to open position, not only must one of the hinges be separable but it must be prevented from separating except when, in projected position, the cover is free to be swung to open position about the inseparable hinge. These criteria are met in the assembly of this invention by its reliance for separation of the separable hinge 21 on the coaction of the push button assembly 27 and the stop shield 51, both acting on the lock rod 44, the former for preventing release of the rod for axial shifting to disengage it from the separable hinge except when the button is pushed and the latter preventing shifting of the rod so long as the shield is backed by the frame. A hard push on the button not only releases the rod from restraint in shifting by the button assembly but projects the cover to venting position, thus freeing the rod from the shield and enabling the cover, freed of restraints, to be swung to open position about the inseparable hinge. Restoring the cover to normal closed position after use as a hatch, simply requires manual interfitting of the parts of the web 22 of the separable hinge 21 with the button 28 pushed to clear the rod 44 of the ledge 49, releasing the button to reengage the rod with the ledge under force of the return springs 36 of the button assembly 27, swinging the shield inwardly to clear the frame, and pulling the cover by the handholds 14 to closed position.

From the above detailed description it will be apparent that there has been provided an improved combined vent and escape hatch for vehicles having a cover hinged to opposite sides of a frame by a pair of hinges, one of which is separable, prevents separation of the separable hinge except when the cover is projected to open position by a lock rod having one end engaging a cover part of the separable hinge and the opposite end engaging a frame-backed stop shield associated with the inseparable hinge, and a push button instanding from the cover and operative when pushed to cam the rod from engagement with the separable hinge and by projecting the cover to venting position, disengage the rod from the stop shield, thus separating the separable hinge and enabling the cover to be swung to open position about the opposite hinge.

It should be understood that the described and disclosed embodiment is merely exemplary of the invention and that all modifications are intended to be included that do not depart from the spirit of the invention and the scope of the appended claims.

Having now described our invention, we claim:

1. A vehicle vent and escape hatch assembly, comprising a frame bounding an opening in a vehicle, a cover for opening and closing said opening, hinges connecting said cover to opposite sides of said frame for limited movement to venting position relative to said frame sides, one of said hinges being separarable into frame and cover parts, rectilinearly shiftable rod means normally engaging said separable hinge for preventing separation thereof in closed and venting positions of said cover, and means operative in said venting position for rectilinearly shifting said rod means to disengage said separable hinge therefrom and enable said cover to be swung to open position about the other hinge.

2. A vehicle vent and escape hatch assembly, comprising a frame bounding a vehicle opening, a cover for opening and closing said opening, said cover being connected by hinges to opposite sides of said frame and normally partly openable to venting position relative to certain of said sides, one of said hinges being separable for enabling said cover to be swung from venting to open position about the other hinge, and rectilinearly shiftable rod means normally engaging said separable hinge for preventing separation of said one hinge when said cover is in closed and venting positions, said rod means in said venting position being rectilinearly shiftable for disengaging said rod means from said separable hinge and enabling said cover to be swung to open position about the other hinge.

3. A vehicle vent and escape hatch assembly, comprising a frame bounding a vehicle opening, a cover for opening and closing said opening, said cover being hinged to opposite sides of said frame by hinges, one of said hinges being separable for enabling said cover to be swung to open position about the other hinge, said cover being partly openable to venting position relative to certain of said sides, rectilinearly shiftable rod means normally engaging said separable hinge for holding said separable hinge against separation when said cover is in closed and venting positions, and push button means instanding from said cover and operatively connected to said rod means, said push button means being operative when pushed for raising said cover from said frame to venting position and by rectilinearly shifting said rod means disengaging said separable hinge from said rod means and enabling said cover to be swung open.

4. A vehicle vent and escape hatch assembly according to claim 2, wherein the one hinge is separable into frame and cover parts, the other hinge is inseparable, the rod means normally engages said frame part and extends through the inseparable hinge, and stop means beyond said inseparable hinge and backed by the frame normally yieldably resists rectilinear shifting of said rod means.

5. A vehicle vent and escape hatch assembly according to claim 4, including a lock block mounted against relative axial movement on the rod means, spring-urged button means instanding from the cover and having upstanding arms straddling said lock block, cam slots in said arms receiving a crosspin on said block and yieldably holding the crosspin in said slots in position to hold the rod means in engagement with the frame part of the separable hinge, and pushing of the button cams the crosspin from narrow vertical to elongated horizontal legs of said slots and, by disengaging the rod means from said frame part and stop means, projects the cover to open position.

6. A vehicle vent and escape hatch assembly according to claim 1, wherein the hinges are toggle linkages, the cover includes an inner panel and a rigid backup plate backing said panel, the means operative in said venting position of the cover for disengaging said separable hinge from said rod means include a button assembly attached to said panel, a stop shield cooperating with said rod means to hold the separable hinge against separation in the closed position of the cover, and the hinges, means supporting the rod means, button assembly and stop shield of the assembly are attached to said inner panel and mounted on said backup plate for relieving said panel of stress.

7. A vehicle vent and escape hatch assembly according to claim 6, wherein the inner panel includes a flat peripheral flange and a multi-sided dome instanding therefrom, and handholds in certain of said sides for enabling said assembly to be manually vented at selected sides.

8. A vehicle vent and escape hatch assembly according to claim 4, wherein the hinges are toggle hinges, and the stop means is a stop shield pivotally mounted on the cover back of the inseparable hinge and having an arc-limiting upper part looped partially around the inseparable hinge.

9. A vehicle vent and escape hatch assembly according to claim 2, wherein the cover includes an inner panel to which said hinges are attached, and the preventing means include a button assembly comprised of a spring-urged push button seating in an downwardly opening frusto-conical pocket in and instanding from said panel, a housing projecting downwardly through said pocket in and secured to said panel, a lock block reciprocable longitudinally in said housing, and arms on said button extending into said housing and straddling and cam-connected to said block.

10. A vehicle vent and escape hatch assembly according to claim 9, wherein the rectilinearly shiftable means extends longitudinally through and is releasably secured against relative movement to said block, and the cam-connection includes a crosspin on said block and received in L-shaped slots in said arms.

* * * * *